United States Patent [19]

Nakayama

[11] 4,142,187
[45] Feb. 27, 1979

[54] DUAL FREQUENCY ALARM DEVICE USING DOPPLER EFFECT FOR SENSING A MOVING OBJECT

[75] Inventor: Hiroshi Nakayama, Machida, Japan

[73] Assignee: Hochiki Corporation, Tokyo, Japan

[21] Appl. No.: 778,732

[22] Filed: Mar. 17, 1977

[30] Foreign Application Priority Data

Mar. 19, 1976 [JP] Japan .............................. 51-32235[U]

[51] Int. Cl.² ............................................. G08B 13/24
[52] U.S. Cl. .................................... 340/554; 340/560; 343/5 PD
[58] Field of Search ........... 340/258 R, 258 A, 258 B, 340/552, 554, 558, 560; 343/5 PD, 7.7

[56] References Cited

U.S. PATENT DOCUMENTS

| | | | |
|---|---|---|---|
| 3,673,590 | 6/1972 | Corvi et al. ...................... | 340/258 A |
| 3,691,558 | 9/1972 | Hoard et al. .......................... | 343/7.7 |
| 3,728,721 | 4/1973 | Lee et al. ............................ | 343/5 PD |
| 3,838,408 | 9/1974 | McMaster ............................ | 340/214 |
| 3,932,871 | 1/1976 | Foote ................................. | 343/5 PD |
| 3,945,008 | 3/1976 | Schnucker .......................... | 343/7 PF |
| 4,010,459 | 3/1977 | Pontoppidan et al. .......... | 340/258 A |

FOREIGN PATENT DOCUMENTS

| | | |
|---|---|---|
| 1554417 | 1/1969 | France. |
| 2211662 | 7/1974 | France. |
| 1316087 | 5/1973 | United Kingdom. |
| 1348782 | 3/1974 | United Kingdom. |

OTHER PUBLICATIONS

*Electronic Intrusion Alarms;* Cantor, "Electronics World", vol. 80, No. 4, Oct. 1978, pp. 34-36.

*Primary Examiner*—Donald J. Yusko
*Assistant Examiner*—Joseph E. Nowicki
*Attorney, Agent, or Firm*—Flynn & Frishauf

[57] ABSTRACT

An electrical or supersonic wave having a predetermined frequency is emitted as a monitor wave from an emitting device into a zone to be monitored. When a moving object having an inherent velocity range intrudes into the zone, a reflected wave of the monitor wave from the moving object is received by a receiver and an alarm signal is issued when the frequency deviation of the reflected wave relative to the frequency of the emitted monitor wave is within the frequency range corresponding to the velocity range. The alarm device has a circuit for producing a first alarm responsive to the alarm signal, a circuit for changing the frequency of the monitor wave when the first alarm is issued, and a circuit for producing a second alarm when a further alarm signal is obtained from the monitor wave with changed frequency within a predetermined time after change of the monitor wave frequency. The circuit for changing the frequency of the monitor wave comprises a variable capacitance diode and a voltage regulating circuit which progressively changes the reverse bias voltage for the variable capacitance diode. The circuit for producing the second alarm comprises a signal processing circuit that produces a trigger signal for producing the most important alarm when an alarm signal has been produced for the overall frequency relative to the monitor wave with progressively changing frequency. The alarm is designed for inclusion of different degrees of seriousness of warning by gradual reduction of the monitor zone with changes in the frequency of the monitor wave.

10 Claims, 9 Drawing Figures

DUAL FREQUENCY ALARM DEVICE USING DOPPLER EFFECT FOR SENSING A MOVING OBJECT

BACKGROUND OF THE INVENTION

This invention relates to a device for giving an alarm through detection of an intruder or similar moving objects and that is suitable as a burglar alarm device. More particularly, it relates to an improved device using electrical or supersonic waves and Doppler effects.

There is known an alarm device that senses a person intruding into a room or near a safe to produce alarm signals. Such device is so constructed that an electrical or supersonic wave is emitted as a monitor wave into a monitor zone and, as the monitor wave is reflected from the object, the frequency deviation due to Doppler effects of the reflected wave is sensed from the reflected wave for producing alarm signals. The device of this kind is generally so constructed that a monitor wave having a predetermined frequency is emitted from an emitting device into the monitor zone, and the reflected wave of such monitor wave due to reflection from the moving object is received by a receiver, the frequency deviation of the reflected wave due to Doppler effects being then sensed for producing an alarm. As the monitor wave, an electrical wave in the UHF or SHF frequency range or supersonic wave higher than 25 KHz is used. Therefore, if there should be any extraneous electrical or supersonic waves such as a carrier or spurious wave emanating irregularly from the transmitters of the citizen band, amateur band or police band radio system or radio controlled model or irregular sonic waves caused by wind or dropping goods, these extraneous signals may act as noises which may cause the device to produce an erroneous alarm. If these noise signals are of short duration, the generation of the erroneous alarm may be prevented through signal integration in the circuit of the alarm device. There is however no measure for effective prevention of erroneous alarms caused by noise signals of longer duration.

SUMMARY OF THE INVENTION

It is a primary object of this invention to improve the alarm quality against such noise signals and, for that purpose, to provide means for changing the frequency of the emitted monitor wave and for producing an alarm in case predetermined Doppler signals should be obtained regardless of such change of the monitor waves.

Another object is to provide lower detecting sensitivity for cases where the monitor wave with the changed frequency is used than for cases where the monitor wave with the prime frequency is used, in such a manner that the extent of the monitored zone is gradually reduced with the change in the frequency of the monitor wave and the alarm signals obtained later may be of higher reliability.

Still another object is to provide an alarm device capable of performing these functions through control by electrical signals.

According to the present invention, an alarm device comprises means for emitting electrical or supersonic waves of a predetermined frequency into a monitored area. The reflected wave from a moving object intruding into said monitored area with a certain proper moving velocity range is received by a receiver, an alarm signal being issued when the Doppler frequency deviation of the reflected wave relative to the emitted monitor wave is contained within the frequency range corresponding to said velocity range. The present invention is characterized in that the emitting means comprises an oscillating circuit having a resonator including a variable capacitance diode (varicap) for changing the frequency of the monitor wave to be emitted, and means for emitting the output of said oscillating circuit into said monitored area, and that said receiver comprises means for receiving the reflected wave, said receiving means being more matched to the monitor wave with the frequency prior to the change than to the monitor wave with the frequency subsequent to the change, said receiver being connected sequentially to a detecting circuit adapted for detecting said frequency deviation for obtaining the Doppler signals, and a signal processing circuit designed for storing for a predetermined time of the energy of the Doppler signal when the Doppler signal includes a signal component having more than a predetermined amplitude within the frequency range corresponding to the velocity range and for producing a pulse output when the amount of the stored energy exceeds a predetermined value. Further provided is a first alarm means that is energized by said pulse output, said signal processing circuit being connected to a voltage regulating circuit adapted for changing the reverse bias voltage to said variable capacitance diode for a predetermined time in order to change the monitor wave frequency, and to an alarm signal issuing circuit that issues an output signal when the pulse output from the monitor wave with the frequency subsequent to the change are caused within a predetermined time following the pulse output resulting from the monitor wave with the frequency prior to the change, said alarm signal issuing circuit being connected to second alarm means that is energized by said output signal.

In this invention, the sensing means senses the frequency deviation of the reflected wave due to Doppler effects using a similar principle to that of Doppler radars used with aircraft navigation systems. When the electrical or supersonic wave of a predetermined frequency f is emitted as a monitor wave, and the reflected wave is received from a moving object at a velocity V, the frequency deviation fd due to Doppler effects of the received reflection wave relative to the frequency f of the monitor wave is given by the following formula $$fd = \frac{2V \cos\alpha}{\lambda} \quad (1)$$

where $\alpha$ is an angle between the direction of the reflected wave and the direction of movement of the moving object, and $\lambda$ is the wavelength of the monitor wave which is c/f in case of electrical waves, c being the velocity of light and v/f in case of supersonic waves, v being the velocity of sound.

Thus, if the moving object is an intruding person that moves at 1 to 4 km/hr, and an electrical wave of 900 MHz is used as the monitor wave, the frequency deviation fd will be in the range of 1.7 to 6.7 Hz. Similarly, for an electrical wave of 600 MHz, fd will be in the range of 1.1 to 4.4 Hz. With use of a 35 KHz supersonic wave as the monitor wave, the deviation fd will be in the range of 57 to 230 KHz for a room temperature of 15° C. Similarly, with a 26 KHz supersonic wave, fd will be in the range of 42 to 170 Hz. The Doppler signal with the frequency fd may be detected as a low frequency signal through, e.g., mixing detection of the emitted monitor wave and the reflected wave.

When the moving object is an intruding person, its moving velocity is not constant but changes in a pulsating manner with each step. For instance, when a person is walking at a mean velocity of 3 km/hr, his instantaneous walking velocity changes in a pulsating manner in a range of 1 to 5 km/hr. Thus, the frequency fd of the resulting Doppler signal is changed in a pulsating manner. The pulsating width of the moving velocity and that of fd are correlated by the above equation (1).

Moreover, parts of a walking human body such as hands, arms, legs and head move randomly at a faster velocity than the mean walking velocity, thereby causing flickering of a higher frequency to said fd.

Therefore, the sensed Doppler signal is passed through a bandpass filter for taking out only the component of a predetermined frequency bandwidth corresponding to the velocity variation width of the moving object. The predetermined bandwidth is of course determined by the properties of the bandpass filter. In this determination, the moving speed proper to the moving object, its pulsation and said "flickering" are taken into account. When a pedestrian is involved, the frequency of said "flickering" which must be taken into account in determining said bandwidth is considered to be usually less than about 2–5 times the fd value which corresponds to the mean moving speed.

The Doppler signal as said low frequency signal is not only subject to pulsating frequency changes but to changes in amplitude. This may be ascribable to such a situation that, as the monitor wave of a constant frequency is emitted into a space of predetermined ambient conditions decided by furniture or a wall, standing waves are caused to exist in the space. Said standing waves may be unequivocally decided by said predetermined ambient conditions. In the presence of certain standing waves, the input impedance of the receiving element is constant regardless of whether or not the receiving element is common with a transmitting element. When a moving object has intruded into such space with a resulting reflection of the monitor wave, the above impedance will be changed in dependence upon whether such reflection has occurred at the nodal or antinodal points of the standing wave.

The changes in amplitude occur in dependence upon the moving speed of the object so that, when the object has a pulsating speed change mode as described above, a pulsating change is caused in the impedance of the receiving element, resulting in changes in the amplitude of the Doppler signal with changes in the impedance.

Such change in amplitude of the Doppler signal is naturally proportionate to the intensity of the reflected waves which depends in turn upon the apparent size of the moving object relative to the receiving element. Thus, the changes in the amplitude of the Doppler signals may not be the same when the reflected waves emanate from smaller objects such as insects or larger objects such as intruding persons. It is thus possible to discriminate these smaller objects from larger ones by setting a certain threshold on the changes in amplitude of the Doppler signal. Such discrimination of the signal amplitude may be feasible by passing the Doppler signals through a Schmitt circuit or a comparator.

Thus, according to a preferred embodiment of the present invention, the Doppler signals obtained by detection as low frequency signals are passed through the abovementioned bandpass filter for judging whether the moving velocity of the object corresponds to that of the object being monitored, and through the abovementioned Schmitt circuit or comparator for judging whether the object has a size of the object under consideration. The Schmitt circuit or comparator used for such purpose is so constructed that pulse signals with a width corresponding to the time in which the Doppler signals of the predetermined frequency range are in excess of a predetermined amplitude level may be generated each time the amplitude of the Doppler signals exceed said predetermined level. These pulse signals are passed through an integrating circuit for providing a trigger pulse that actuates a first alarm means only when more than a predetermined number of the output pulse signals are produced within a predetermined time. Simultaneously with actuation of the first alarm means, the frequency of the monitor wave is changed for a predetermined time, such as by a monostable multivibrator, for making a judgement on whether the signal is an error signal caused by noises.

Thus, a plurality of monitor waves with mutually different frequencies are used for monitoring a moving object and another alarm is issued from second alarm means when the similar Doppler signal has been obtained for any of these different frequencies. Such another alarm will be issued only when a moving object corresponding to the monitored object exists but not when the first alarm means is actuated by noises. In other words, it is when the frequency of noise waves bears a certain fixed relation with that of the monitor wave that the first alarm means is energized by the noise signals. No alarms will be produced by noise waves when the monitor wave frequency is changed. As there is only little possibility that further noise signals that will reestablish the necessary "alarm" relation will be issued after the changes have been made in the frequency of the monitor wave, such change of the monitor wave frequency is an effective practical tool for combatting adverse effects caused by undesirable noises. According to the present invention, the oscillating frequency of an oscillating circuit provided in a monitor wave emitting device is decided by a variable capacitance diode. A voltage regulating circuit is energized for a predetermined time such as with a monostable multivibrator, responsive to application of input signals to said first alarm means for changing the reverse bias voltage to said diode and thereby changing the capacitance of the variable capacitance diode. It goes without saying that the receiving frequency should be changed correspondingly at the receiver for receiving the reflection wave of the changed frequency. With changes in the frequency of the monitor waves, the frequency range of the Doppler signal is slightly changed from that obtained from the monitor wave prior to frequency changes. A fairly satisfactory result may however be obtained by proper setting of the bandwidth of the bandpass filter with the setting of the two frequencies taken into account. When electrical waves are used as monitor waves, by having the receiving antenna tuned with the prior frequency and slightly mismatched with the subsequent frequency, the extent of the monitored zone will become slightly narrower after the change of the monitor wave frequency. The effective sensitivity of the energizing device for the second alarm means may be lowered slightly for enhancing the gravity or seriousness of the alarm from the second alarm means.

The same is true with use of supersonic waves as monitor waves. Thus, provision is made of a receiving oscillator resonating with the prior frequency and a receiving oscillator resonating with the posterior (or changed) frequency and the latter oscillator is designed for mismatching with a transformer designed for taking out a signal from these oscillators. With an alarm device of this kind using electrical waves as monitor waves, if the electrical waves are in the UHF range, a rod antenna is used as the receiving antenna, such rod antenna not having a markedly superior frequency selectivity. Thus, there is no risk that any extreme change of the monitored zone may be produced that will disable the alarm device. A moderate reduction of the monitored zone may be realized by changing the frequency of the monitor waves from 900 to 600 MHz. If a parabola antenna with a beam-like directivity or ground plane antenna having a marked frequency selectivity is used in place of a rod antenna, more critical matching may be realized with respect to the frequency, resulting in more pronounced reduction of the monitored zone. The extent of frequency changes necessary for realizing the same extent of the zone reduction will be lesser than when the rod antenna is used. Thus, the extent of reduction of the monitored zone similar to the case of using the rod antenna may be realized by changing from 900 to 800 MHz instead of 600 MHz. Such reduced extent of the changes in frequency is favorable for setting the bandwidth of the bandpass filter and the reverse bias voltage of the variable capacitance diode.

As described in the foregoing, the second alarm means is energized in cases where the Doppler signals with the similar frequency and amplitudes should be obtained for any of the plural monitor waves with mutually different frequencies. Thus, the alarm signal issuing circuit according to the invention comprises memory means such as a timer circuit or flip-flop that holds in memory the input signals to the first alarm means obtained with the monitor waves with the prior frequency, an AND gate that will issue an output for energizing the second alarm means when a similar input signal based on the monitor wave with the changed frequency is delivered while the above input signal obtained by the monitor wave with the prior frequency is held in the memory means, and a reset circuit for resetting said memory means and the first alarm means after lapse of a certain time from the change of frequency of the monitor waves.

As the first alarm means issued in a provisional alarm, it may be a thyristor controlled lamp. The second alarm means may have a alarm sounder or lamp controlled by a relay circuit having self-hold characteristics and, as the case may be, a controller for various safeguarding systems against intruders.

DESCRIPTION OF THE PREFERRED EMBODIMENTS

Figure 1:
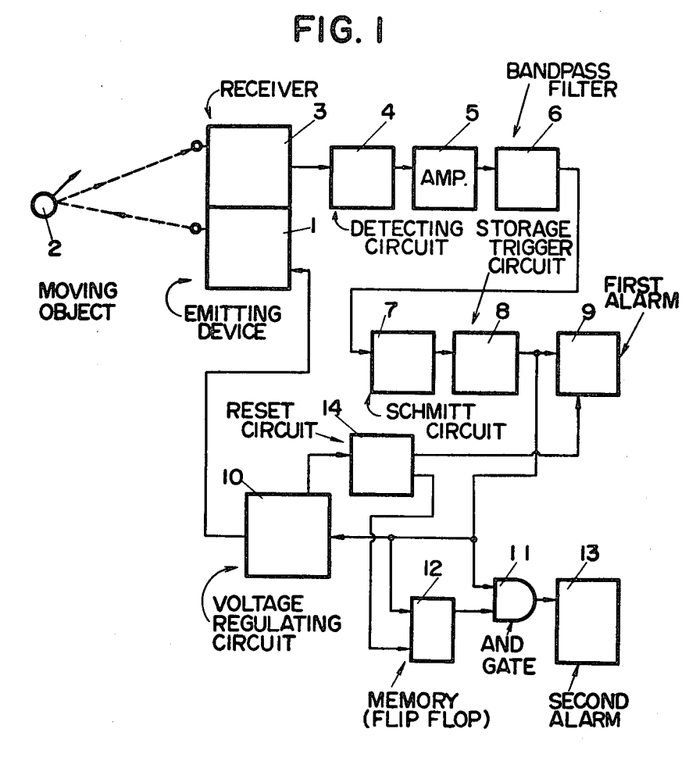
FIG. 1 is a block diagram showing the essential airangement of a first embodiment of the present invention.
Figure 8:
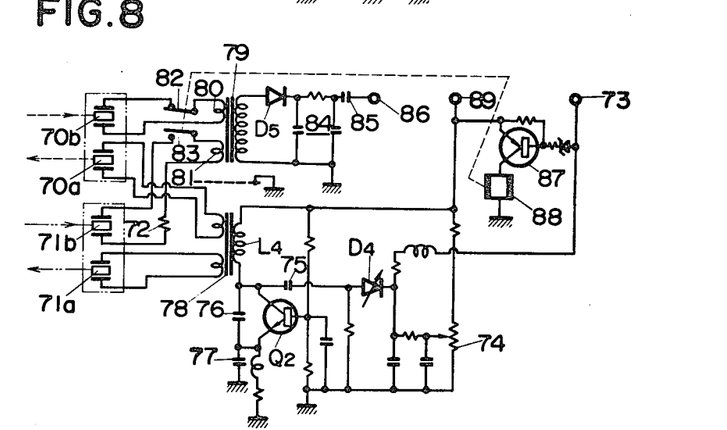
FIG. 8 is a circuit diagram showing monitor wave emitting and receiving devices with a detecting circuit that is used in a modified embodiment of the invention using supersonic waves as monitor waves.

Referring to FIG. 1, a monitor wave emitted from an emitting device 1 is reflected from a moving object 2 or other stationary goods such as furniture or a wall. These reflected signals are received by a receiver 3. A detecting circuit 4 is connected to the receiver 3 for sensing the Doppler components contained in the reflected signals as a low frequency signal. The circuits for the emitting device 1, receiver 3 and detector circuit 4 are shown in FIGS. 2 and 8 for cases using UHF electrical waves and supersonic waves as monitor waves, respectively.

Figure 2:
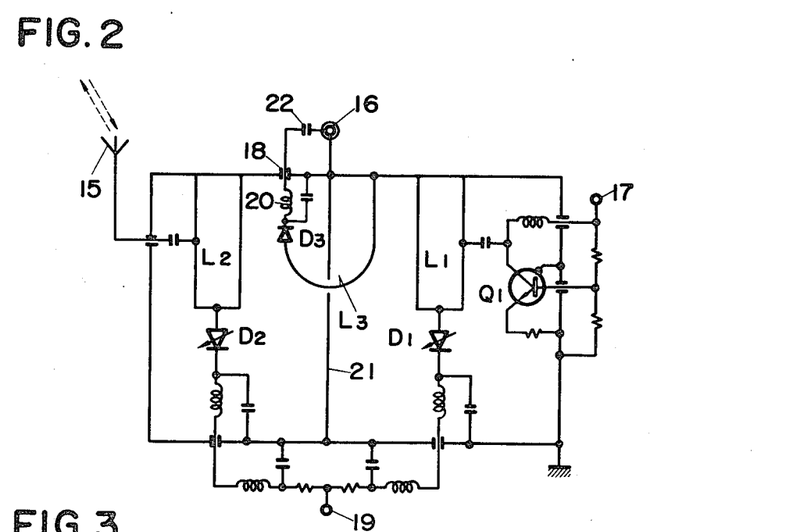
FIG. 2 is a circuit diagram of monitor wave emitting and receiving devices with a detecting circuit that is used in one embodiment wherein UHF range electrical signals are used as monitor waves.

In FIG. 2, $D_1$, $D_2$ denote variable capacitance diodes (varactors or varicaps), the capacitances of which are changed with the value of the reverse bias voltage applied to the terminal 19. An oscillating circuit is formed by a transistor $Q_1$ and a resonator comprised of an inductance element $L_1$ and the diode $D_1$, said element $L_1$ being formed by a coaxial conductor. The oscillating circuit oscillates at a frequency decided by the element $L_1$ and the diode $D_1$. Another resonator comprised of the other diode $D_2$ and an inductance element $L_2$ formed by an another coaxial conductor is separated from the first resonator by a shield plate 21. These two resonators are tuned in advance with each other. An antenna 15 is coupled to the inductance element $L_2$. A link coil $L_3$ is designed for taking out the Doppler signals and for inductive coupling of the elements $L_1$, $L_2$ with each other. The output of the oscillating circuit is induced in the link coil $L_3$ through the element $L_1$ and in the element $L_2$ through the link coil $L_3$ so as to be emitted into space from the antenna 15. The frequency of the monitor wave is changed with changes in the capacitances of the diodes $D_1$, $D_2$, and the antenna 15 is matched to the prior frequency. In the absence of the moving object 2 (see FIG. 1) in the space, a predetermined high frequency signal is induced in the link coil $L_3$, and no signal changes are caused at the output terminal 16 connected to the link coil $L_3$ through a capacitor 22. As the moving object 2 intrudes into the space and a reflected wave caused thereby is received at the antenna 15, a Doppler signal is induced in the element $L_2$ due to the frequency deviation of the reflected wave, such Doppler signal being induced in the link coil $L_3$. The beat frequency signal of these waves and the Doppler signal is induced in the link coil $L_3$ and heterodyne detected by a mixer diode $D_3$ for producing a Doppler signal as a low frequency signal at the terminal 16. The output signal is applied as an input to a signal processing circuit. In FIG. 2, the numeral 18 denotes a through-type capacitor, 20 a choke coil that chokes the high frequency components in conjunction with a capacitor, and 17 a positive source terminal.

Figure 3:
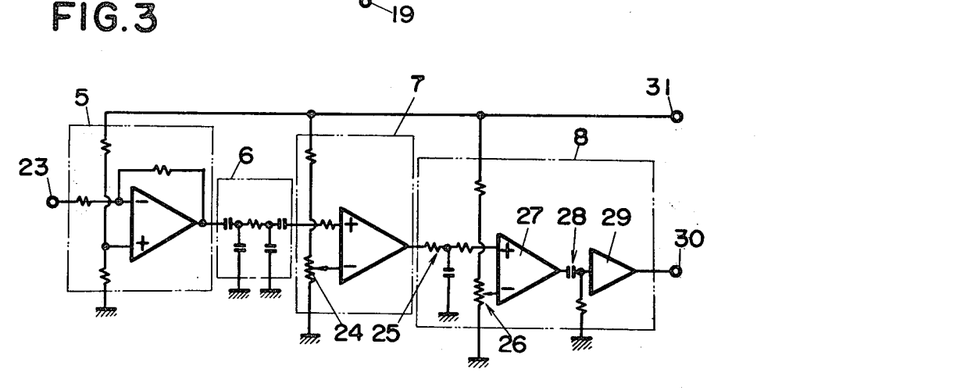
FIG. 3 is a circuit diagram showing a signal processing circuit used in one embodiment of the present invention.

The signal processing circuit comprises an amplifier 5, a bandpass filter 6, a Schmitt circuit 7 and a storage-trigger circuit 8, as shown in FIG. 3. In FIG. 3, the amplifier 5 is a conventional negative feedback amplifier and designed for amplifying the input Doppler signal at the input terminal 23 by a predetermined gain. The amplified Doppler signal is then passed through the bandpass filter 6 for eliminating other frequency components than those within the range of 2 to 20 Hz, for example, for ascertaining the moving velocity range of the moving object. The resulting signal is then applied to the Schmitt trigger circuit 7 for producing pulse outputs having pulse widths corresponding to the time in which the Doppler signal exceeds a reference amplitude. Each of the pulse outputs may be produced only when said Doppler signal has an amplitude in excess of a reference amplitude set on a potentiometer 24. In the following stage of the Schmitt circuit, the signals are processed in the form of pulses. The pulse signals from the Schmitt circuit 7 are applied to the storage-trigger circuit 8 where the energy of the pulse signals is stored by an integrating circuit 25.

When the storage level at the circuit 25 exceeds a level set on the potentiometer 26, a comparator 27 emits pulse output which is passed through a differentiating circuit 28 and a switching amplifier 29 and applied to terminal 30 as a first rectangular trigger pulse with short rise time and short fall time. In FIG. 3, the numeral 31 denotes a positive source terminal.

Referring again to FIG. 1, the first trigger pulse from terminal 30 in FIG. 3 is applied as an input to the first alarm means 9 and to the voltage regulating circuit 10 for energizing them during its rise time. The first trigger pulse is also applied to the AND gate 11 and to the memory 12 for setting said memory 12 during its fall time.

Figure 4:
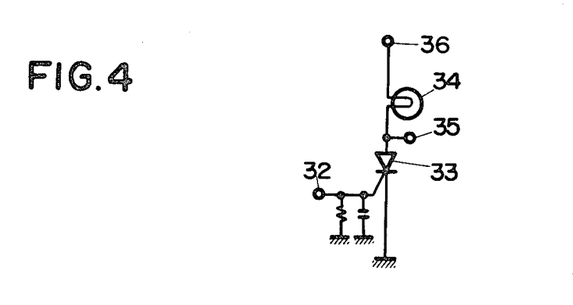
FIG. 4 is a circuit diagram showing an embodiment of first alarm means.

FIG. 4 shows the circuit of the first alarm means 9 comprising a thyristor 33 that is energized when the trigger pulse from terminal 30 is applied to an input terminal 32, and a lamp 34 that is turned on with conduction of the thyristor 33. In FIG. 4, the numeral 35 denotes a reset input terminal that turns off the thyristor 33 when a reset signal is received from a reset circuit 14 to be later described, and the numeral 36 a positive source terminal.

Figure 5:
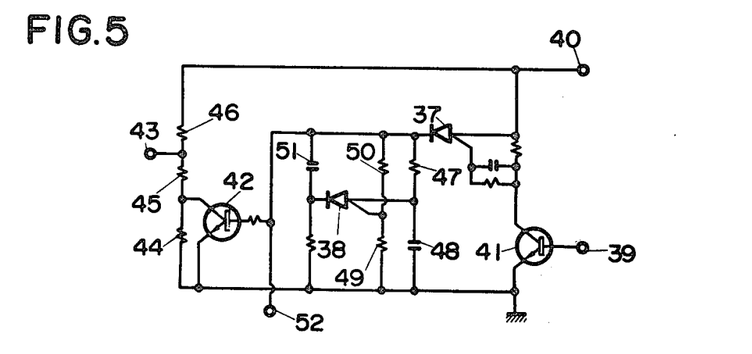
FIG. 5 is a circuit diagram showing an embodiment of a voltage regulating circuit.

The voltage regulating circuit is shown in FIG. 5 and comprises a monostable multivibrator formed by two programmable unijunction transistors 37, 38, hereafter referred to as PUT. The numeral 39 denotes an input terminal for receiving the first trigger pulse from the terminal 30, and 40 a positive source terminal. The monostable multivibrator is controlled by a transistor 41. The transistor 41 is rendered conducting during the rising time of the first trigger pulse applied to the terminal 39. As the transistor 41 conducts during the rising time of the first trigger pulse, at the same time the PUT 37 and transistor 42 are turned on so that the predetermined voltage that has appeared at the bias output terminal 43 is changed to a lower voltage due to shunting of a resistance 44 of a voltage divider caused by conduction of the transistor 42. The bias output terminal 43 is coupled to the terminal 19 (FIG. 2) so that the capacitances of the diodes $D_1$, $D_2$ are changed by the above voltage change and the monitor wave frequency is now changed to a lower frequency than that prevailing before the frequency change. The voltage change ratio is set to a desired value by proper selection of the resistances 44, 45, 46 constituting the voltage divider. As the PUT 37 is conductive, the capacitor 48 is charged through a resistance 47 with a predetermined time constant. When the charge potential reaches a predetermined value set by the resistances 49, 50, after the time lapse as set by said time constant, the PUT 38 is rendered conductive. The charge potential of the capacitor 48 is combined with that of another capacitor 51 that has been charged during the conducting period of the PUT 37. Thus the cathode potential of the PUT 37 is transiently higher than the anode potential, resulting in the cutoff of the PUT 37 and transistor 42. The voltage appearing at the bias terminal 43 is restored to its prior value. The numeral 52 denotes a terminal for taking out signals to be delivered to the reset circuit 14 to be described later.

Figure 6:
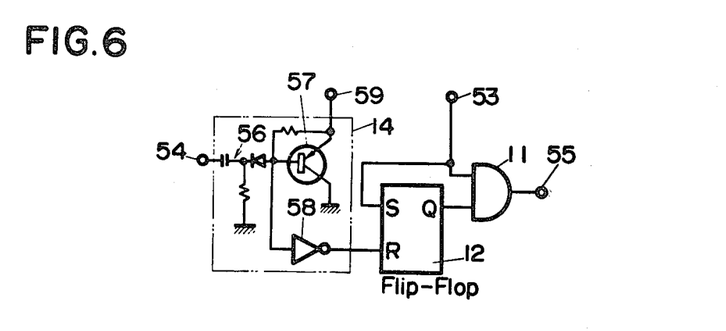
FIG. 6 is a circuit diagram showing an embodiment of an alarm signal issuing circuit.

FIG. 6 shows a circuit of an alarm signal issuing circuit comprising the reset circuit 14, memory 12 and the AND gate 11. In the present embodiment, the memory 12 is formed by a flip-flop. In FIG. 6, the first trigger pulse from terminal 30 (FIG. 3) is applied to a terminal 53 and the output signal from the monostable multivibrator supplied from terminal 52 is applied to the terminal 54. The trigger pulse applied to the terminal 53 is applied to one input terminal of the AND gate 11. The same trigger pulse is also applied to a set terminal S of the flip-flop 12 in such a manner that the flip-flop 12 is set during the fall time of the first trigger pulse and an output signal "1" appears at an output terminal Q. The signal "1" is kept at the terminal Q by the flip-flop 12 until a reset input is applied to the reset terminal R. The terminal Q is connected to the other input terminal of the AND gate 11. Thus, if the next trigger pulse (second trigger pulse) is applied to the terminal 53 until the reset input is supplied, the signal "1" will appear at both input terminals of the AND gate 11 so that an output signal is produced at an output terminal 55 of the AND gate 11. Said output signal serves as an energizing input to the second alarm means to be later described. The output of the monostable multivibrator as applied to the terminal 54 is applied through a differentiator 56 contained in the reset circuit 14 for causing a transistor 57 to conduct during the fall time of the output. Namely, as the voltage of the bias terminal 43 is returning to the prior value, the transistor 57 is turned ON. Simultaneously, a reset input is applied to a reset terminal R of the flip-flop 12 through an inverter 58. The transistor 57 has its emitter connected to a terminal 35 through terminal 59 so that the thyristor 33 of the first alarm means is de-energized with shunting of the transistor 57 and the lamp 34 is turned off. As the reset input is applied to the flip-flop 12, the output terminal Q is reset to "0" for closing the AND gate.

Figure 7:
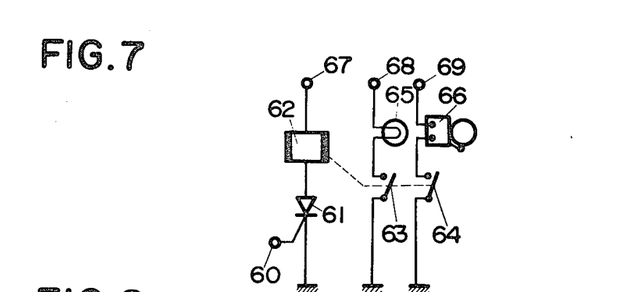
FIG. 7 is a circuit diagram showing an embodiment of second alarm means.

FIG. 7 shows the second alarm means 13 energized by the output of the AND gate 11 and comprising, in the present embodiment, a thyristor 61 that conducts upon reception from AND gate 11 of the output signal "1" at gate terminal 60 through terminal 55, a relay 62 energized by thyristor 61, relay contacts 63, 64, a lamp 65 that is operationally controlled by the relay contact 63, and an alarm bell 66 controlled by the relay contact 64. The terminals 67, 68, 69 are positive source terminals.

According to the alarm device so far described, the frequency of the monitor wave is changed instantly for a predetermined time upon energization of the first alarm means. The second alarm means comes into operation only when an input of the changed frequency is still applied to the first alarm means. After such frequency change, unless there is an input to the first alarm means, the first alarm means and the flip-flop are reset to their original state after lapse of the time for such frequency change. After the frequency change, the monitor zone is reduced slightly, and the alarm issued from the second alarm means is rendered more grave or serious than that issued from the first alarm means.

In the foregoing embodiments, described by reference to FIGS. 2 to 7, electrical waves in the UHF range are utilized as monitor waves. In the case of using ultrasonic waves as monitor waves, the emitting device 1 and receiver 3 as well as detecting circuit 4 are arranged as shown in FIG. 8, and the passband of the bandpass filter 6 is set correspondingly as described in the foregoing.

In FIG. 8, the numerals 70a, 71a denote supersonic oscillators designed for transmitting two different resonating frequencies such as 35 KHz and 26 KHz and the numerals 70b, 71b denote supersonic oscillators designed for receiving these resonating frequencies, e.g., 35 KHz and 26 KHz. These transmitting and receiving oscillators may each be replaced by one oscillator having broad band characteristics. With the above frequency range of the oscillators, the above bandpass filters may have a bandwidth of 40 to 400 Hz for the moving velocity of the object in the range of 1 to 4 km/hr. In FIG. 8, the terminal 73 corresponds to the terminal 19 (FIG. 2) and is used for application of reverse bias voltage. In the present embodiment, the reverse bias voltage of the variable capacitance diode $D_4$ is adjusted in advance by a variable resistor 74 for realizing a resonating frequency of, e.g., 35 KHz in conjunction with the coil $L_4$. The voltage dividing resistances 44, 45, 46 of the voltage regulating circuit 10 are so set that a resonating frequency of, e.g., 26 KHz may be realized upon conversion of the voltage applied to the terminal 73. $Q_2$ denotes an oscillating transistor that constitutes an oscillating circuit in conjunction with capacitors 75, 76, 77, diode $D_4$ and the primary coil $L_4$ of the transmitting transformer 78.

A first ultrasonic wave used as a monitor wave is emitted from the oscillator 70a at, e.g., 35 KHz and, as the bias voltage applied to terminal 73 is changed, a second ultrasonic wave is emitted from the oscillator 71a at, e.g., 26 KHz. The transmitting and receiving oscillators with the same frequency are usually held by oscillation absorbent material and arranged in a side-by-side relation within the same package so that the oscillation of the transmitting oscillator may not be applied direct to the receiving oscillator. Thus, only little leakage occurs from the transmitting oscillator to the receiving oscillator. The oscillators 70b, 71b are connected respectively with two primary coils 80, 81 of the receiving transformer 79 through relay contacts 82, 83 with accurate matching of the transformer with the oscillator 70b so that a slight shift in the matching occurs between the transformer and the oscillator 71b that comes into use after a frequency change. As means for shifting the matching, an adjustable resistor 72 may be connected in series with the oscillator 71b. A detecting circuit comprising a diode $D_5$ and filter 84 is connected to the secondary side of the receiving transformer 79. The beat frequency component resulting from the leak component of the transmitting oscillator and the reflected wave is detected by the diode $D_5$. The detected output is taken out as a Doppler signal at the output terminal 86 after elimination of the d.c. component by the capacitor 85, said output being then applied to the above referenced amplifier 5.

The relay contacts 82, 83 are switched by a relay 88 that is activated by the transistor 87 with changes in the voltage applied to the terminal 73, so that the oscillator connected to the transformer 79 is switched from the oscillator 70b to the oscillator 71b. The numeral 89 denotes the positive source terminal.

According to the alarm device explained so far, the monitor wave is emitted in the first monitor mode at a certain frequency and any predetermined Doppler signals that may be obtained during operation in such mode are indicated at the same time that the frequency of the monitor wave is changed for establishing a second monitor mode. When similar Doppler signals are obtained during the second monitor mode as those obtained during the first monitor mode, a final alarm will be issued. Thus, the error alarm caused by random extraneous noises of predetermind frequencies may be prevented for providing a positive alarm.

Figure 9:
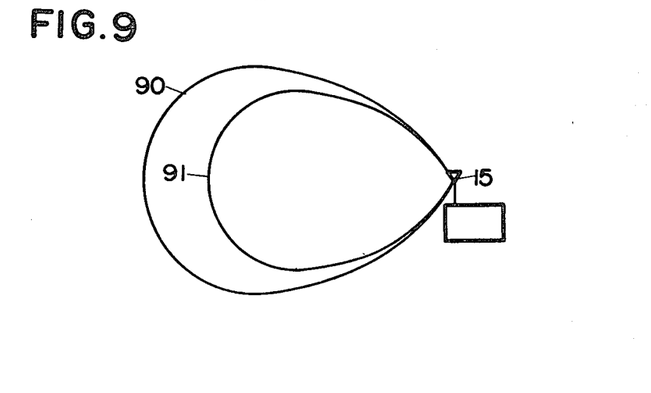
FIG. 9 is a diagram showing the changes in extent of the monitored zone.

As shown in FIG. 9, with the alarm device of the present invention, the monitor zone 90 that corresponds to the first mode in which the first monitor wave is issued from antenna 15 or supersonic oscillators 70a, 70b is broader than the monitor zone 91 that corresponds to the second mode with the different frequency monitor wave. Thus, if the safe or other object is placed near the emitting end of the monitor waves, close approach of the intruder towards, e.g., the safe may be intimated by the alarm to be issued in the second mode, the alarm being rendered more grave or serious.

We claim:
1. An alarm device comprising:
a monitor wave emitting device for selectively emitting electrical or supersonic monitor waves of at least two predetermined frequencies, said monitor wave emitting device comprising an oscillating circuit having a resonator including variable capacitance diode means for changing the frequency of the monitor wave to be emitted from a first frequency to a second frequency, reverse bias voltage means coupled to said diode means, and means for emitting the output of said oscillating circuit as monitor waves into the monitored area;
a receiver for receiving the reflected waves from a moving object intruding into the monitored area within a given moving velocity range, said receiver comprising receiving means for receiving said reflected waves, said receiving means being more matched to said first frequency monitor wave than to said second frequency monitor wave;
a detecting circuit coupled to said receiver for detecting the frequency deviation of the received reflected waves for obtaining a Doppler signal;
signal processing circuit means coupled to said detecting circuit for storing, for a predetermined time, signal components of the Doppler signal of the frequency range corresponding to the velocity range when said Doppler signal components have greater than a predetermined amplitude and for generating first and second pulse outputs when the amplitudes of the stored Doppler signal components exceed a predetermined value;
first alarm means coupled to said signal processing circuit and activated by said pulse output thereof;
a voltage regulating circuit coupled to said signal processing circuit and to said emitting device for receiving the first pulse output for changing the reverse bias voltage to the variable capacitance diode means for a predetermined time in order to change the emitted monitor wave frequency;

an alarm signal issuing circuit coupled to said signal processing circuit for generating an output signal when the second pulse output resulting from the reflected monitor wave with the frequency subsequent to the frequency change is generated within a predetermined time following the first pulse output resulting from the reflected monitor wave with the frequency prior to the change; and second alarm means coupled to said alarm signal issuing circuit for generating an alarm responsive to the output signal of said alarm signal issuing circuit.

2. The alarm device as recited in claim 1 wherein the signal processing circuit means comprises an amplifier coupled to the detecting circuit for amplifying the Doppler signal from the detecting circuit; a bandpass filter coupled to the amplifier for passing only the Doppler signal from the amplifier that is contained within a predetermined frequency range; a Schmitt circuit coupled to the bandpass filter for providing pulse signals having a width corresponding to the time in which the amplitude of the Doppler signal from the bandpass filter exceeds a predetermined amplitude level; and a storage-trigger circuit coupled to the Schmitt circuit for integrating the pulse signals delivered during a predetermined time and providing a rectangular trigger pulse when the integrated value exceeds a predetermined level.

3. The alarm device as recited in claim 1 wherein the voltage regulating circuit comprises a monostable multivibrator coupled to the signal processing circuit and being set by the first pulse output from the signal processing circuit and reset after lapse of a predetermined time; a transistor coupled to the monostable multivibrator and rendered conducting by the set output of the monostable multivibrator; and a voltage divider having a resistor coupled to the transistor so as to be shorted by conduction of the transistor, the voltage value obtained from the voltage divider being changed with conduction and non-conduction of the transistor.

4. The alarm device as recited in claim 1 wherein the alarm signal issuing circuit comprises a memory that holds said first pulse output from the signal processing circuit associated with the emitted monitor wave with the frequency prior to the frequency change; an AND gate coupled to said memory for issuing an output signal responsive to said second pulse output from the signal processing circuit associated with the emitted monitor waves with the frequency subsequent to the frequency change while the memory holds said first pulse output; and a reset circuit for resetting the memory and the first alarm means after lapse of a predetermined time after the frequency change of the emitted monitor wave.

5. The alarm device as recited in claim 4 wherein the memory is a flip-flop having a set input which is connected to the signal processing circuit in such a manner that the flip-flop is set during the fall time of the first pulse output of the signal processing circuit for producing a signal "1" at an output of the flip-flop, and wherein the voltage regulating circuit comprises a monostable multivibrator that is set during rise time of the first pulse output from the signal processing circuit and reset after the lapse of a predetermined time; the flip-flop having a reset input which is connected to the monostable multivibrator in such a manner that the flip-flop is reset during the fall time of a set output of the multivibrator for switching the flip-flop output from "1" to "0"; the flip-flop output being connected to one input of the AND gate so that the second pulse output of the signal processing circuit is applied to the other input of the AND gate.

6. The alarm device as recited in claim 4 wherein the voltage regulating circuit comprises a monostable multivibrator that is set during the rise time of the first pulse output of the signal processing circuit and reset after the lapse of a predetermined time, and the reset circuit comprises a differentiating circuit that provides a reset pulse for resetting the memory during the fall time of a set output of the monostable multivibrator and a transistor that conducts responsive to the reset pulse from the differentiating circuit for de-activating the first alarm means.

7. The alarm device as recited in claim 1 wherein the emitting device, receiver and the detecting circuit are provided, for emitting electrical waves as monitor waves, receiving reflected waves and detecting Doppler signals, with an oscillating circuit having a first resonating circuit including a first variable capacitance diode, a second resonating circuit that is tuned with said first resonating circuit and including a second variable capacitance diode, an antenna coupled to the second resonating circuit, a link coil for inductively coupling the first and second resonating circuit and a diode for mixing detection connected to the link coil, the antenna being used both as a transmitting and receiving antenna.

8. The alarm device as recited in claim 1 wherein the emitting device, receiver and the detecting circuit are provided, for emitting supersonic waves as monitor waves, receiving reflected waves and detecting Doppler signal, with a supersonic oscillating circuit having a resonator including a variable capacitance diode and a primary coil of a transmitting coupling transformer, a supersonic transmitting oscillator connected to a secondary coil of the transmitting coupling transformer and tuned with the resonating frequency of the resonator, a supersonic receiving oscillator having the same resonating frequency as that of the transmitting oscillator, a receiving coupling transformer connected to the receiving oscillator with a primary coil thereof, a detecting diode connected to a secondary coil of the receiving coupling transformer, and a filter circuit connected to the detecting diode for providing the Doppler signal.

9. The alarm device as recited in claim 8 wherein the transmitting coupling transformer has a plurality of separate secondary coils, and said receiving coupling transformer has a plurality of primary coils, and wherein plural transmitting supersonic oscillators having mutually different resonating frequencies are connected to separate secondary coils of the transmitting coupling transformer, plural receiving supersonic oscillators having mutually different resonant frequencies and paired with said plural transmitting oscillators are connected through respective switch means to separate respective primary coils of the receiving coupling transformer; and further comprising variable reverse bias voltage means coupled to said variable capacitance diode to change the capacitance thereof and to thereby change the resonant frequencies of the supersonic oscillators; the switch means being so activated that receiving oscillators with resonant frequencies matching with the resonant frequency of the resonator are coupled selectively to the receiving coupling transformer with changes in the reverse bias voltage.

10. The alarm device as recited in claim 9 wherein said switch means comprises a plurality of relay contacts coupling respective ones of said receiving supersonic oscillators to the separate primary coils of the receiving coupling transformer.

* * * * *